(12) United States Patent
Shpantzer et al.

(10) Patent No.: US 7,242,481 B2
(45) Date of Patent: Jul. 10, 2007

(54) LASER VIBROMETRY WITH COHERENT DETECTION

(75) Inventors: Isaac Shpantzer, Bethesda, MD (US); Aviv Salamon, Tel-Aviv (IL); Pak Shing Cho, Silver Spring, MD (US)

(73) Assignee: Celight, Inc., Silver Spring, MD (US)

( * ) Notice: Subject to any disclaimer, the term of this patent is extended or adjusted under 35 U.S.C. 154(b) by 343 days.

(21) Appl. No.: 11/055,547

(22) Filed: Feb. 9, 2005

(65) Prior Publication Data

US 2005/0185191 A1 Aug. 25, 2005

Related U.S. Application Data

(63) Continuation-in-part of application No. 10/669,130, filed on Sep. 22, 2003.

(60) Provisional application No. 60/543,065, filed on Feb. 9, 2004.

(51) Int. Cl.
*G01B 11/02* (2006.01)
*G01B 9/02* (2006.01)

(52) U.S. Cl. ............ 356/502; 356/485; 356/487; 356/498

(58) Field of Classification Search .......... 356/485, 356/487, 492, 493, 502; 73/182, 655
See application file for complete search history.

(56) References Cited

U.S. PATENT DOCUMENTS 4,470,696 A * 9/1984 Ballard ............... 356/28.5
4,526,465 A * 7/1985 Corti et al. .......... 356/35.5
5,060,312 A    10/1991 Delavaux
5,351,116 A *  9/1994 Barton et al. ....... 356/28.5
5,486,923 A *  1/1996 Mitchell et al. .... 356/499

(Continued)

FOREIGN PATENT DOCUMENTS

DE          3442988          6/1985

OTHER PUBLICATIONS

Michael Hercher & Geert Wyntjes, Interferometric Measurement of in-plane Motion, SPIE Optical Testing and Metrology III: Recent Advances in Industrial Optical Inspection, 1990 vol. 1332, pp. 602-612.*

(Continued)

*Primary Examiner*—Gregory J. Toatley, Jr.
*Assistant Examiner*—Scott M Richey

(57) ABSTRACT

An optical system provides information about tangential vibration components of a surface at remote location. The optical system includes a light source assembly that emits first and second beams, each having one or more wavelengths and one or two polarizations. The first and second beams are directed to the interrogated surface. A detector system is positioned to detect a third beam formed by at least a portion of the first and second beams being reflected from the interrogated surface. The first, second and third beams having incident and reflection angles relative to the interrogated surface that do not lay in a same plane. The detector system positioned remotely from the interrogated surface, and providing information on a phase change in the third beam relative to the first and second beam. The phase change is indicative of at least one surface vibration vector component of the interrogated surface. The detector system is a 90 degree optical hybrid balanced detector with four photodiodes.

46 Claims, 4 Drawing Sheets

U.S. PATENT DOCUMENTS

| | | | | |
|---|---|---|---|---|
| 5,587,785 | A | * 12/1996 | Kato et al. | 356/28.5 |
| 5,654,818 | A | 8/1997 | Yao | |
| 5,734,108 | A | * 3/1998 | Walker et al. | 73/650 |
| 5,783,752 | A | * 7/1998 | Thorburn et al. | 73/800 |
| 6,040,899 | A | * 3/2000 | Breda | 356/28.5 |
| 6,078,384 | A | * 6/2000 | Dammann et al. | 356/28.5 |
| 6,844,537 | B2 | * 1/2005 | Wilson et al. | 250/206.1 |
| 6,972,846 | B2 | * 12/2005 | Lal et al. | 356/486 |
| 7,064,840 | B2 | * 6/2006 | Ito | 356/477 |
| 2004/0160661 | A1 | 8/2004 | Hurrell et al. | |
| 2004/0208414 | A1 | 10/2004 | Lee et al. | |

OTHER PUBLICATIONS

Polytec, Inc., "signal processing", http://www.polytec.com/int/158_1004.asp?highlightSubMenu=Vibrometer%20University&highlightPopupMenu=Signal%20Processing, (3 pgs.).

Metrolaser, Inc., "Metrolaser Products", http://www.metrolaserinc.com/vibrometer.htm, (2 pgs.).

Ono Sokki, Co., "LV series of Laser Doppler Vibrometers—Velocity Sensors", http://www.onosokki.co.jp/English/hp_e/whats_new/SV_rpt/SV_2/svtec.html, (7 pgs.).

* cited by examiner

LASER VIBROMETRY WITH COHERENT DETECTION

CROSS-REFERENCE TO RELATED APPLICATIONS

This application claims the benefit of U.S. Ser. No. 60/543,065, filed Feb. 9, 2004. This application is also a continuation-in-part of U.S. Ser. No. 10/669,130, filed Sep. 22, 2003. Both of the above applications are fully incorporated herein by reference.

FIELD OF INVENTION

This invention relates generally to the systems and methods for measuring vibration frequency of an interrogated surface, and more particularly to systems and methods for measuring vibration frequency in three dimensions in response to optical signal detection.

BACKGROUND OF THE INVENTION

The principles of Doppler Laser vibrometry are well known to the person skilled in the art, the general description can be found for example at the web site of Polytec company, CA. Vibrometers based on this principle can remotely measure surface velocities, or vibrations, with high spatial resolution and over a broad frequency and amplitude range.

A coherent laser beam is projected on to the surface under investigation. Light scattered back from the surface is shifted in frequency by an amount proportional to the velocity of the surface (the Doppler effect). The instrument measures this frequency shift to produce an instantaneous velocity signal, which can subsequently be analyzed.

By adding coordinate control using scanning mirrors, a single point vibrometer sensor can be used to scan across a surface, gathering multi-point data from vibrating objects. See for example, vibrometers produced by company Metrolaser, CA, Laser Doppler vibrometers at: http://www.metrolaserinc.com/vibrometer.htm [2].

The most basic laser Doppler vibrometer is the one with a reference beam, see for example models LV-1100 and LV-1300 produced by Ono Sokki, Japan. Laser light released from the light source is split into two beams, one of which serves as an incident beam directed at the object under measurement, while the other serves as a reference beam fed back within the vibrometer. The beam reflected from the object experiences Doppler shift proportion to the vibrators velocity of the object. This beam is then made to interfere with the reference beam, which is given a frequency shift beforehand by the acouslooptic modulator, so that a beat frequency can be obtained. From this beat frequency signal, only the Doppler-shift component is singled out at the detector circuit and sent to the FM demodulator to be output as a voltage signal that is proportional to the vibratory velocity.

The disadvantage of the described above system is in rather low sensitivity of the signal detection, and further improvement of the detection scheme is required to provide the measurement on longer distances and to improve the reliability of the system.

An object does not always vibrate in one direction only. It max in fact vibrate in a complex manner in three-dimensional directions. The LV-3300 is a vibrometric system comprising three reference-beam laser Doppler vibrometer units. The system performs vector calculations is when signals are received from these three vibrometers to simultaneously measure the X-, Y-, Z-axis vibratory velocity and the direction in which the object under measurment vibrates. One of the three optical heads is arranged so that the direction of its incident light coincides with the direction (Z-axis) in which the object moves, while the other two are arranged so that the directions of their incident light (ZX and ZY) are specific angles away from the Z-axis. Signals from these angled optical heads represent the vibratory velocities and vibrations in the ZX and ZY directions. Consequently, beams reflected from all three optical heads contain signal components for the Z, ZX and ZY directions in which the object vibrates. Thus, we can measure the vibratory characteristics of the object for the X-, Y-, and Z-axis directions simultaneously, by inputting these three signals into a vector calculator.

The sensitivity of described above system is not very high, that's why the measuring is carried out on short distances, usually less than one meter to avoid signal fading due to air turbulence effects as well as random vibrations of various elements in the system. In multiple applications a remote vibration measurement is required. One of the examples is a target recognition based on measured vibration frequencies. A target can be hundreds or thousands of meters away from the detector system, and its vibration frequencies must be measured in order to distinguish friend or foe.

SUMMARY OF THE INVENTION

Accordingly, an object of the present invention is to provide systems, and their methods of use, for measurement of a vibration vector of a surface.

Another object of the present invention is to provide systems, and their methods of use, for measurement of a vibration vector of tangential and three-dimensional components.

Yet another object of the present invention is to provide systems, and their methods of use, that provide high sensitivity detection of vibration components of a surface at a location remote from the surface.

A further object of the present invention is to provide systems, and their methods of use, that provide high sensitivity detection of vibration components of a surface at a location remote from the surface with the use of a coherent receiver of an optical signal.

These and other objects of the present invention are achieved in an optical system that provides information about tangential vibration components of a surface at remote location. The optical system includes a light source assembly that emits first and second beams, each having one or more wavelengths and one or two polarizations. The first and second beams are directed to the interrogated surface. A detector system is positioned to detect a third beam formed by at least a portion of the first and second beams being reflected from the interrogated surface. The first, second and third beams having incident and reflection angles relative to the interrogated surface that do not lay in a same plane. The detector system positioned remotely from the interrogated surface, and providing information on a phase change in the third beam relative to the first and second beam. The phase change is indicative of at least one surface vibration vector component of the interrogated surface. The detector system is a 90 degree optical hybrid balanced detector with four photodiodes.

In another embodiment of the present invention, a method is provided for determining information about a surface vibration at a remote location. An optical system is provided that produces at least first and second beams. The first and second beams are directed to an interrogated surface located remotely from the optical system. A third beam is formed and has a phase change relative to the first and second beams that corresponds with a surface vibration of the interrogated surface. A phase of the first and the second beams is changed by Doppler effect when the first and second beams are reflected from the interrogated surface. The third beam is a redirection of the first and the second beams following their reflections from the interrogated surface. At least a portion of the third beam is received at a detector system positioned remote from the interrogated surface. A phase shift of the third beam is measured. The phase shift is induced by the interrogated surface by Doppler effect and is indicative of at magnitude of at least one of a vibration vector component of the interrogated surface.

DETAILED DESCRIPTION OF THE EMBODIMENTS

Figure 1:
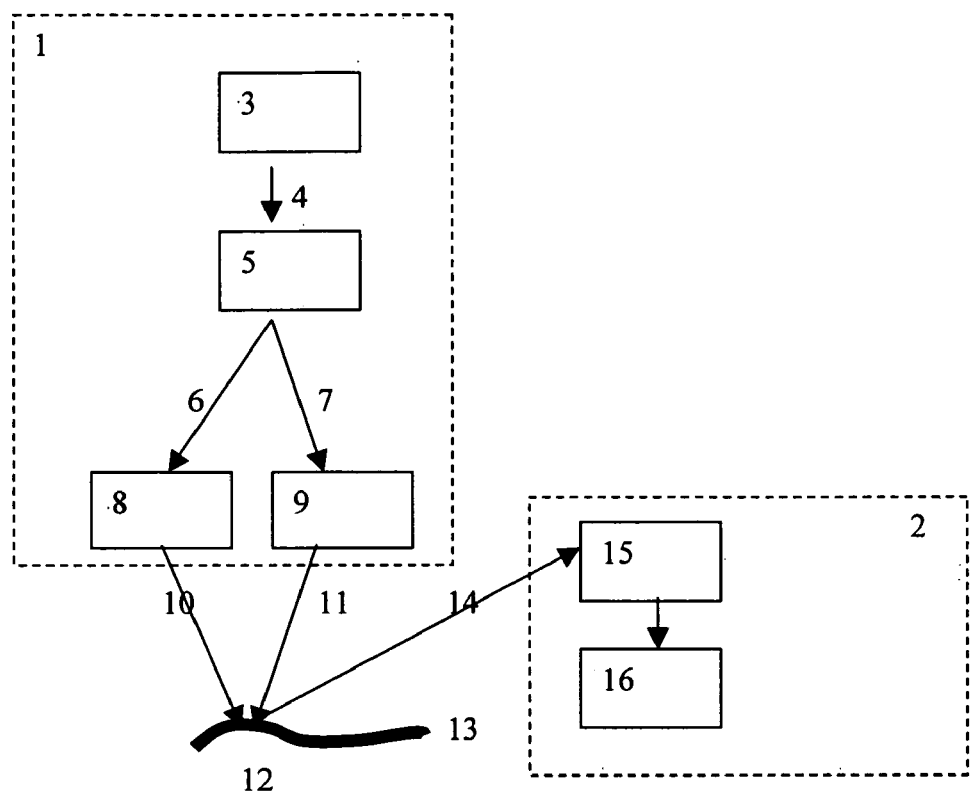
FIG. 1 is a block diagram of one embodiment of a system of the present invention for measurement of tangential components of surface vibration vector.

In one embodiment of the present invention, an optical device is provided, the block diagram of which is shown in FIG. 1, where 1 is a unit that combines elements for interrogated surface illumination, while 2 is the unit for a signal detection and information on vibration recovery block. The system operates as follows: the light source 3 outputs the beam 4 splitted by a splitter 5 into two beams 6 and 7. The light source 3, preferably a laser, generates beam at least one wavelength from in the UV or visible or near infrared or far infrared ranges (from 0.2 nm to 20 µm). The beams 6 and 7 impinge the beam directing devices 8 and 9. These beam directing devices are selected from, a mechanical devices, a mirror on gimbals and a MEMS devices. Beam directing devices enable to perform two functions: (1) target the beams on the particular spot on the interrogated surface; (2) scan the beams over the interrogated surface.

Output beams 10 and 11 are directed on the same spot 12 on the vibrating interrogated surface 13. Light beam 14 reflected from the vibrating spot 12 forms the third beam. The third beam experiences the frequency shift caused by Doppler effect. The phase of the third beam carries information on the vibration frequency of the interrogated surface.

Beam 14 enters the detection unit 2 where it impinges the coherent balanced detector system 15 followed by digital signal processing block 16. In one embodiment of the present invention, the coherent detector includes 90-degrees optical hybrid.

The third beam is formed by redirected light from the first and the second beams.

In one embodiment of the present invention, the light of the first and the second light beams are either time or frequency or polarization multiplexed in order to simplify their separation at the detection stage. This time/wavelength/polarization multiplexing can be done in the following way.

1) Polarization multiplexing: the first and the second beam must have orthogonal polarization. After splitting by the splitter 5 in illuminating unit 1, a polarization-rotating element is introduced in one of the beams, for example, beam 6 that turns its polarization by 90 degrees. Before entering the detection unit 2, the beam 14 passes polarization beam splitter that separates the beams with orthogonal polarizations.

2) Frequency multiplexing: the first and the second beam must have different wavelengths. These two beams can be produced from the same light source followed by DEMUX. Another DEMUX must be installed at the entrance of the detection unit 2 to separate the beams with different wavelengths.

3) Time multiplexing: the first and second beams are emitted at different time frame. At the entrance of the detector unit 2 a splitter divides the third beams into two equal beams, and the delay introduced in one of the arms provides time compensation in order to equalize the arrival time of the first and the second beam.

Using balanced detection scheme improves sensitivity of the vibration measurement by canceling the relative intensity noise (RIN) of the laser. In principle quantum limit of measurement can be attained.

In order to achieve full three-dimensional vector components set one should use more than two illuminating beams, namely three, four or more.

Figure 2:
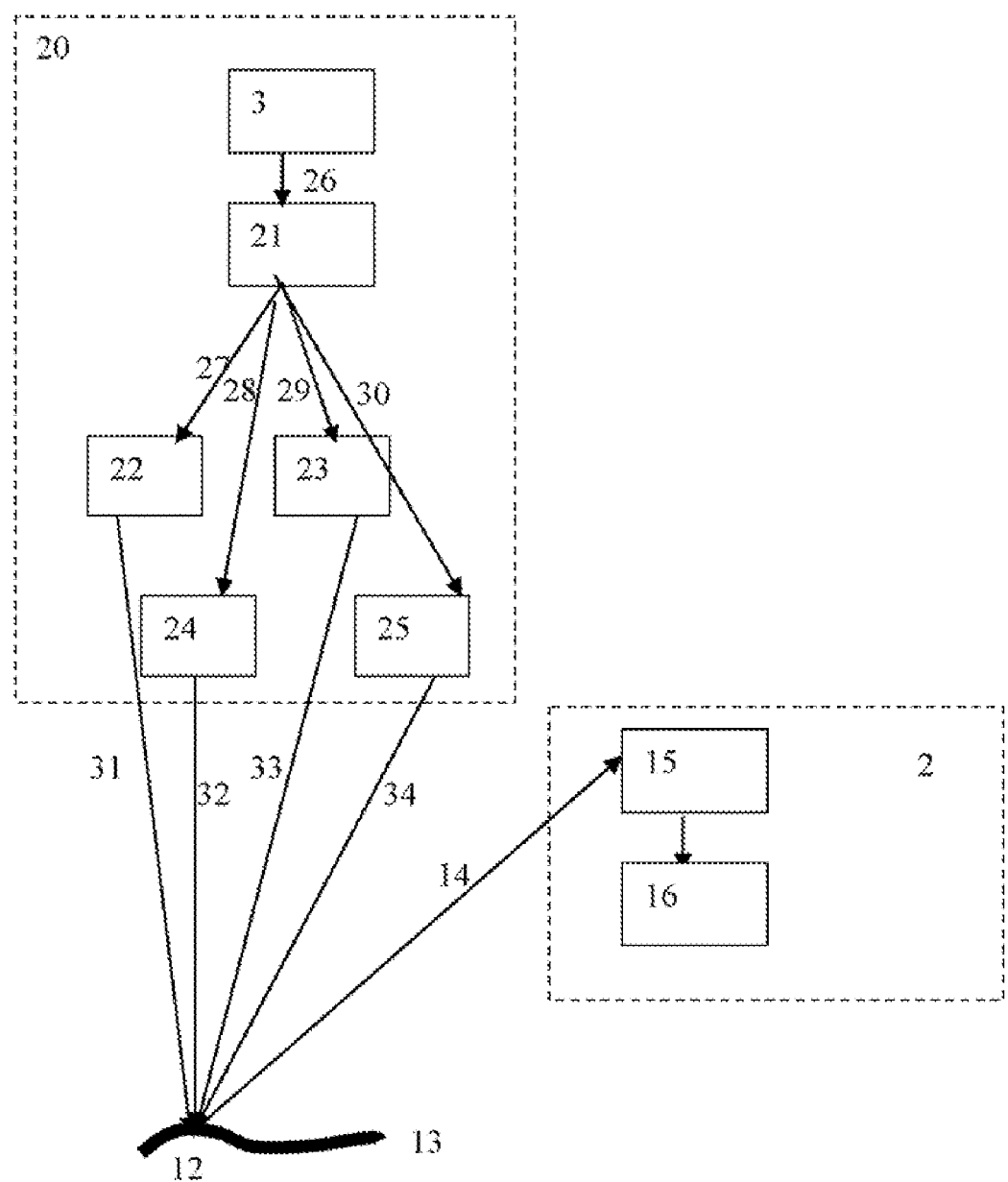
FIG. 2 is a block diagram of one embodiment of a system of the present invention for three-dimensional surface vibration vector measurement.

FIG. 2 shows an embodiment of the present invention in which four laser beams illuminate the spot of the interrogated surface. Illumination unit 20 consists of a light source 3, a beam splitter 21 and four beam directing devices 22, 23, 24, and 25. Output beam 26 from the light source 2 is splitted by the splitter 21 into four beams 27, 28, 29, and 30. These four beams 27-30 are redirected by beam directing devices 22-25 in such a way that all beams 31,32,33,34 target the same spot 12 on the interrogated surface 13. At least a portion of the light from these four beams is reflected by the surface forming the beam 14.

Figure 3:
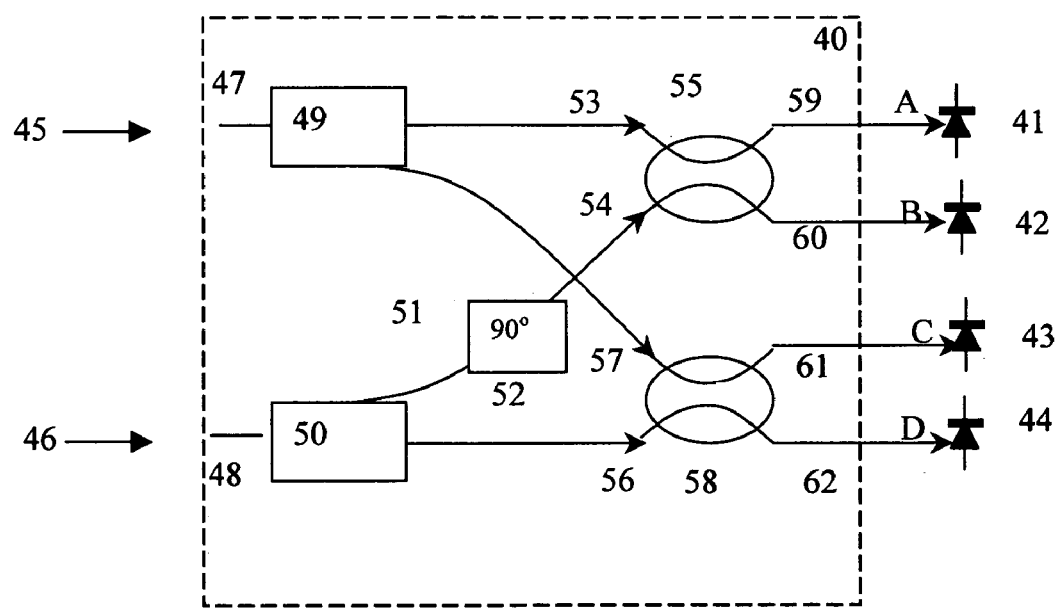
FIG. 3 is a schematic diagram of one embodiment of a balanced detector of the present invention with a 90-degrees optical hybrid.

Similar to described above scheme with two illuminating beams, the beam 14 enters the detection unit 2 where it impinges the coherent balanced detector system 15 followed by digital signal processing block 16. In one embodiment of the present invention, the coherent detector system includes four balanced photodetectors with 90-degrees optical hybrid. A schematic diagram of one embodiment of the coherent balanced detector system is shown in FIG. 3. It consists of a 90° optical hybrid 40 and four balanced photodetectors 41-44. Two incoming optical signals 45 and 46, called, respectively, the signal S and the local oscillator L, impinge two inputs 47 and 48 of the optical hybrid. Both signal beam S and local oscillator L beam are divided by the first set of 3 dB couplers 49 and 50 as shown in FIG. 3. The beam 51 passes through the phase shifter 52 and gains the additional phase shift of 90°. The beams 53 and 54 are combined together at the directional coupler 55. Respectively, the beams 56 and 57 are combined together at the directional coupler 58. The resulting four output signals A, B, C, D coming, respectively, from the outputs 59, 60, 61 and 62, all having 90° relative phase difference of the form: A=S+L, B=S−L, C=S+jL and D=S−jL.

In one embodiment of the present invention, the balanced detector is used as described in the U.S. patent application Ser. No. 10/669,130 "Optical coherent detector and optical communications system and method" by I. Shpantzer et al. incorporated herein by reference.

Figure 4:
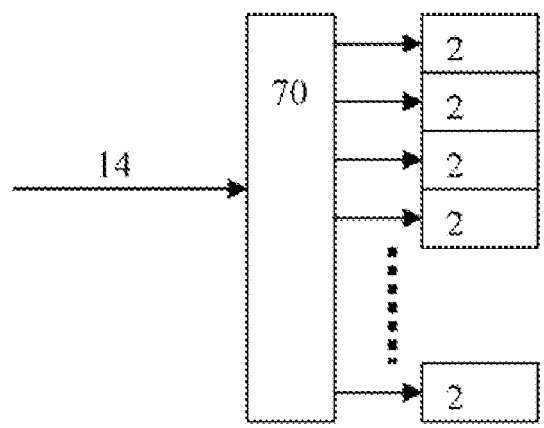
FIG. 4 illustrates one embodiment of a system configuration of the present invention for multiple frequencies measurement at the same time.

In various embodiment, the system of the present invention can either measure one vibration frequency at the time or multiple frequencies at the time. In order to measure multiple frequencies at the same time, the third beam 14 is splitted into multiple beams by splitter 70 as shown in FIG. 4. Each of output beams from the splitter 70 is processed by its own detector unit 2, 2', 2", 2''', etc. that is adjusted for the particular frequency to be measured.

Figure 5:
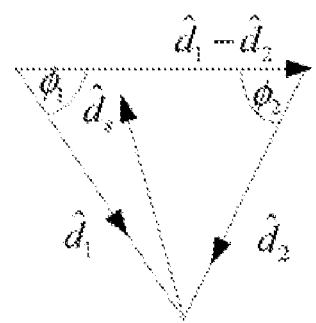
FIG. 5 illustrates a tangential Doppler shift measurement that can be utilized with an embodiment of the preset invention

A method for measuring the tangential vibration components by using two incident beams is depicted in FIG. 5. The two illuminating beams 10 and 11 (the first and the second beams) have angles $\phi_1$ and $\phi_2$ in respect the normal, while the detector is placed at a viewing angle $\phi_s$ (third beam 14 angle). The resulting Doppler frequency shifts are $$\Delta f_1 = \frac{(\hat{d}_1 - \hat{d}_s)_v^\rho}{\lambda}, \Delta f_2 = \frac{(\hat{d}_2 - \hat{d}_s)_v^\rho}{\lambda}$$

where $\hat{d}_1$, $\hat{d}_2$, $\hat{d}_s$ are unit vectors in the directions of the incident and reflected beams, $\vec{v}$ is the relative velocity between the source and target, and $\lambda$ is the light wavelength. The frequency difference between the first and the second beams that form the third beam will be $$\Delta f = \Delta f_1 - \Delta f_2 = \frac{(\hat{d}_1 - \hat{d}_2)_v^\rho}{\lambda} = \frac{(\cos\phi_1 + \cos\phi_2)v_p}{\lambda},$$

where $v_p$ is the component of the velocity between the source and target in the direction $\hat{d}_1 - \hat{d}_2$. The frequency difference does not depend on the direction of the detector ($\hat{d}_s$). Notice that since $$\frac{D}{R} \ll 1$$

the Doppler shift is diminished by a factor of $$\cos\phi_1 + \cos\phi_2 = \frac{D}{R}$$

where D is the distance between the beam sources and R is the distance to the target. This means that in order to have good velocity resolution we will need long observation times.

In order to measure the frequency difference we can beat the reflected beams (the first and the second ones) together in one of the following ways:

1. "Direct detection"—detecting the returned signal with a diode: $|A_1 e^{j(2\pi\Delta f_1 t + \Phi_1)} + A_2 e^{j(2\pi\Delta f_2 t + \Phi_2)}|^2 = |A_1|^2 + |A_2|^2 + 2A_1 A_2 \cos(2\pi\Delta f t + \Delta\Phi)$, which gives a large DC and no information about the sign of the Doppler frequency shift. By giving one of the beams an extra frequency shift $f_0$, we can distance the wanted signal from the DC (practically it is close to heterodyne detection).

2. "Balanced detection"—the two beams will be sent using, for example, two orthogonal polarizations (other multiplexing schemes, namely time and wavelength multiplexing operate in the similar manner), the incoming beam will be split using a polarization beam splitter oriented at 45° to the principal axes, and the two outputs detected with a pair of balanced diodes:

$$\left| \frac{1}{\sqrt{2}} A_1 e^{j(2\pi\Delta f_1 t + \varphi_1)} + \frac{1}{\sqrt{2}} A_2 e^{j(2\pi\Delta f_2 t + \varphi_2)} \right|^2 -$$

$$\left| \frac{1}{\sqrt{2}} A_1 e^{j(2\pi\Delta f_1 t + \varphi_1)} - \frac{1}{\sqrt{2}} A_2 e^{j(2\pi\Delta f_2 t + \varphi_2)} \right|^2 = 2A_1 A_2 \cos(2\pi\Delta f t + \Delta\varphi),$$

thus getting rid of the DC level.

3. "Direct Mixing"—the two beams will be sent using, for example, two orthogonal polarizations (other multiplexing schemes, namely time and wavelength multiplexing operate in the similar manner), the incoming beam will be split using a polarization beam splitter oriented to the principal axes, and the two outputs mixed in the hybrid: $2A_1 A_2 e^{j(2\pi\Delta f t + \Delta\Phi)}$.

4. "Indirect Mixing": As in direct mixing except that each polarization will be mixed with a local oscillator, the outputs can then be mixed electrically (analogically or digitally): $(A_1 e^{j(2\pi\Delta f_1 t + \Phi_1)} A_1 e^{-j(2\pi\Delta f_1 t + \Phi_1^{(l)})})(A_2 e^{j(2\pi\Delta f_1 t + \Phi_2)} A_1 e^{-j(2\pi\Delta f_1 t + \Phi_1^{(l)})})^* = P_1 A_1 A_2 e^{j(2\pi\Delta f t + \Delta\Phi + \Delta\Phi_1)}$. (Using "Indirect Mixing" further improves the sensitivity by using powerful local oscillator.)

The measurement of the radial velocity, can be done by beating each beam with a local oscillator, such as is done in the "Indirect Mixing" method in the first step. Here we will have two measurements, one of the velocity components in the direction of $\hat{d}_1 - \hat{d}_s$ and the other in the direction of $\hat{d}_2 - \hat{d}_s$, which are orthogonal to $\hat{d}_1 - \hat{d}_2$. Alternatively, by mixing the two measurements we would get the velocity component in the direction of $\hat{d}_1 + \hat{d}_2 - 2\hat{d}_s$, which is orthogonal to $\hat{d}_1 - \hat{d}_2$ if $d_s$ is orthogonal to $\hat{d}_1 - \hat{d}_2$.

Two more beams are utilized in order to determine the velocity in the third axis, this measurement will have to be time mixed with the previous one, since we can't distinguish more beams based on polarization. Alternatively, we could use a different wavelength, or use a slight frequency shift (bigger than the possible Doppler values), for the two additional beams.

Figure 6:
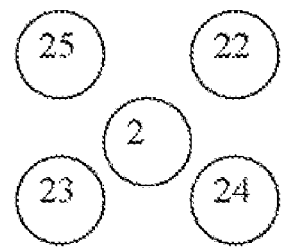
FIG. 6 illustrates one embodiment of a system configuration of the present invention with four beams used in a 2-by-2 formation.

FIG. 6 shows a possible system configuration, four beams are used in a 2-by-2 formation (22,23 and 24,25), such that their returns can be distinguished in the receiver 2 located in the middle (using polarization/wavelength/time). Each is mixed with a local oscillator and sampled to get $S_i = A_i e^{j(2\pi\Delta f_i t + \Phi_1)}$, i=1 . . . 4. The radial Doppler is measured by looking at $S_1 S_2 S_3 S_4$, and the tangential Doppler components by looking at $S_1 S_2 S_3^* S_4^*$ and $S_1 S_3 S_2^* S_4^*$.

The sensitivity of the disclosed technique for vibration components measurement is e superior to other systems and methods as a result of the methodology as well as the use of balanced detection at the receiver followed digital signal processing (e.g., noise compensation) for further sensitivity improvement. Balanced detection using matched pair of photodiodes provides approximately 3-dB improvement of SNR compared with detection using a single photodiode as suggested by prior art. The usually high DC component associated with single photodiode detection is removed using balanced detection. Furthermore, balanced detection allows suppression of laser RIN from the local laser, which is not possible with single photodiode detection.

The procedure described above discloses the measurement of the vibration vector at the particular point of the interrogated surface. In order to receive a whole map of the surface vibration, the scanning over the surface is applied. In the disclosed system the scanning is performed by beam directing devices 8 and 9 (FIG. 1) and 22-25 (FIG. 2).

The vibrometer disclosed in the present invention comprises three features mentioned above, namely reference beam, scanning ability, and three-dimensional measurement of the vibration vector combined with improved sensitivity and reliability compared with the standard approach.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An optical system that provides information about tangential vibration components of a surface at remote location, comprising:
   a light source assembly that emits first and second beams each having one or more wavelengths and one or two polarizations, the first and second beams being directed to the interrogated surface at a first and a second incident angles respectively;
   a detector system positioned to detect a third beam formed by at least a portion of the first and second beams being reflected from the interrogated surface; the first, second and third beams do not lay in a same plane, the detector system positioned remotely from the interrogated surface, the detector system providing information on a phase change in the third beam relative to the first and second beam indicative of at least one surface vibration vector component of the interrogated surface, the detector system being a 90 degree optical hybrid balanced detector with four photodiodes.

2. The system of claim 1, wherein frequencies measured at the interrogated surface in response to the first and second beams are from 20 Hz to 20 KHz.

3. The system of claim 1, wherein the detector system is positioned to provide that the detector system is physically separated from the interrogated surface.

4. The system of claim 1, wherein the detector system is positioned at least 1-1000 meters from the interrogated surface.

5. The system of claim 1, wherein the first and second beams are at the first and the second angles $\Phi_1$ and $\Phi_2$ respectively, relative to the interrogated surface.

6. The system of claim 5, wherein angles $\Phi_1$ and $\Phi_2$ are in the range of 0 to 90 degrees.

7. The system of claim 5, wherein at least one of the angles $\Phi_1$ and $\Phi_2$ is 45 degrees.

8. The system of claim 1, wherein the first and second beams have orthogonal polarizations.

9. The system of claim 1, wherein the first and second beams have different wavelengths.

10. The system of claim 1, wherein the first and second beams are time multiplexed.

11. The system of claim 1, wherein the first beam generates at least one wavelength from in at least one of, the UV, visible, near infrared, mid infrared and far infrared ranges.

12. The system of claim 11, wherein the near IR wavelengths are 0.7 to 2.5 micrometer.

13. The system of claim 11, wherein the mid IR wavelengths are 2.5-20 micrometer.

14. The system of claim 1, further comprising first and second beam directing devices positioned to direct the first and second beams to the interrogated surface.

15. The system of claim 14, wherein the first and second beam directing devices are selected from at least one of, a mechanical device, a mirror on gimbals and a MEMS device.

16. The system of claim 1, further comprising first and second scanning devices positioned to provide scanning of the first and second over the interrogated surface.

17. The system of claim 16, wherein the first and second beam scanning devices are selected from at least one of, a mechanical device, a mirror on gimbals and a MEMS device.

18. The optical system of claim 1, wherein the detector system is an interferometer.

19. The optical system of claim 18, wherein the detector system is configured to provide homodyne detection of the third beam.

20. The system of claim 18, wherein the detector system, includes: a first coupler coupled to a first input and producing at least a first and second output; a second coupler coupled to a second input and producing at least a first and second output; a third coupler coupled to the first output of the first coupler and to the first output of the second coupler; a fourth coupler coupled to the second output of the first coupler and to the second output of the second coupler; first and second crossing waveguides each with an angle selected to minimize crosstalk and losses between the first and second cross waveguides, the first crossing waveguide coupling one of the first or second outputs from the first coupler with an input of the fourth coupler, the second crossing waveguide coupling one of the first or second outputs from the second coupler with an input of the third coupler; and a first phase shifter coupled to the first or second waveguides, the first and second waveguides coupling one of the outputs of the first or second coupler and one of the inputs of the third or fourth couplers, wherein the first, second, third and fourth couplers, the two crossing waveguides and the phase shifter are each formed as part of a single planar chip made of an electro-optical material.

21. The optical device of claim 18, wherein the optical device is selected from at least one of, an integrated device, a freespace optical link device, and a fiber optics device.

22. The optical device of claim 20, wherein the integrated device is a chip on one or more pieces of optical crystal.

23. The optical device of claim 18, wherein the electro-optical material is selected from at least one of, a semiconductor and a ferroelectric material.

24. The optical device of claim 23, wherein the ferroelectric material is selected from $LiNbO_3$ and $LiTaO_3$.

25. The optical system of claim 18, wherein the detector system includes a digital processor configured to measure a phase shift of the third beam that is induced by the vibrating surface.

26. The detector system of claim 18, further comprising: a DSP engine configured to compensate for phase noise induced by fluctuations of a refractive index of an air path between the interrogated surface and the detector system.

27. The system of claim 1, wherein the detector system detects one vibration frequency at a time.

28. The system of claim 1, wherein the detector system detects a plurality of vibration frequencies at one time.

29. The system of claim 1, wherein the light source assembly produces a fourth and a fifth beam that are directed to be incident on the interrogated surface, the third beam receiving at least a portion of the fourth and fifth beams after they are reflected from the interrogated surface.

30. The system of claim 1, further comprising: a DSP device configured to recover information of three-dimensional components of an interrogated surface vibration vector.

31. The system of claim 1, wherein the first and second beams have orthogonal polarizations.

32. The system of claim 1, wherein the first and second beams have different wavelengths.

33. The system of claim 1, wherein the first and second beams are time multiplexed.

34. A method for measuring a surface vibration at a remote location, comprising:
providing an optical system that produces at least first and second beams directing the first and second beams to an interrogated surface located remotely, from the optical system;
forming a third beam having a phase change relative to the first and second beams that corresponds with a surface vibration of the interrogated surface, a phase of the first and the second beams being changed by Doppler effect when the first and second beams are reflected from the interrogated surface; the third beam being a redirection of the first and the second beams following their reflections from the interrogated surface;
receiving at least a portion of the third beam at a detector system positioned remote from the interrogated surface; and
measuring a phase shift of the third beam, the phase shift being induced by the interrogated surface by Doppler effect,
determining the phase shift being indicative of a magnitude of at least one of a vibration vector component, wherein the magnitude corresponds to one point of a map of the surface vibration,
displaying at least one point on the map of the interrogated surface vibration.

35. The method of claim 34, wherein frequencies measured at the interrogated surface in response to the first and second beams are from 20 Hz to 20 KHz.

36. The method of claim 34, wherein the detector system is positioned to provide that the detector system is physically separated from the interrogated surface.

37. The method of claim 34, wherein the detector system is at least 1-1000 meters from the interrogated surface.

38. The method of claim 34, wherein the first and second beams are directed at angles $\Phi_1$ and $\Phi_2$ relative to the interrogated surface.

39. The method of claim 34, wherein the first and second beams illuminate a same spot on the interrogated surface.

40. The method of claim 34, wherein the optical system produces a spectrum of wavelengths in UV, visible, near infrared, mid infrared and far infrared ranges.

41. The method of claim 34, wherein the detector system detects one vibration frequency at a time.

42. The method of claim 34, wherein the detector system detects a plurality of vibration frequencies at one time.

43. The method of claim 34, further comprising utilizing at least a first beam directing device to direct the first and the second beams to the interrogated surface.

44. The method of claim 34, wherein the detector system is an interferometer.

45. The method of claim 43, wherein the detector system provides homodyne detection of the third beam.

46. The method of claim 34, further comprising directing a fourth and a fifth beams to the interrogated surface; and redirecting a portion of the fourth and fifth beams into the third beam after the fourth and fifth beams are reflected from the interrogated surface.

* * * * *